March 27, 1928.　　　　　　　　　　　　　　　　1,663,838
K. R. HARMON
TRANSMISSION MECHANISM
Filed May 3, 1927　　　　　　2 Sheets-Sheet 1
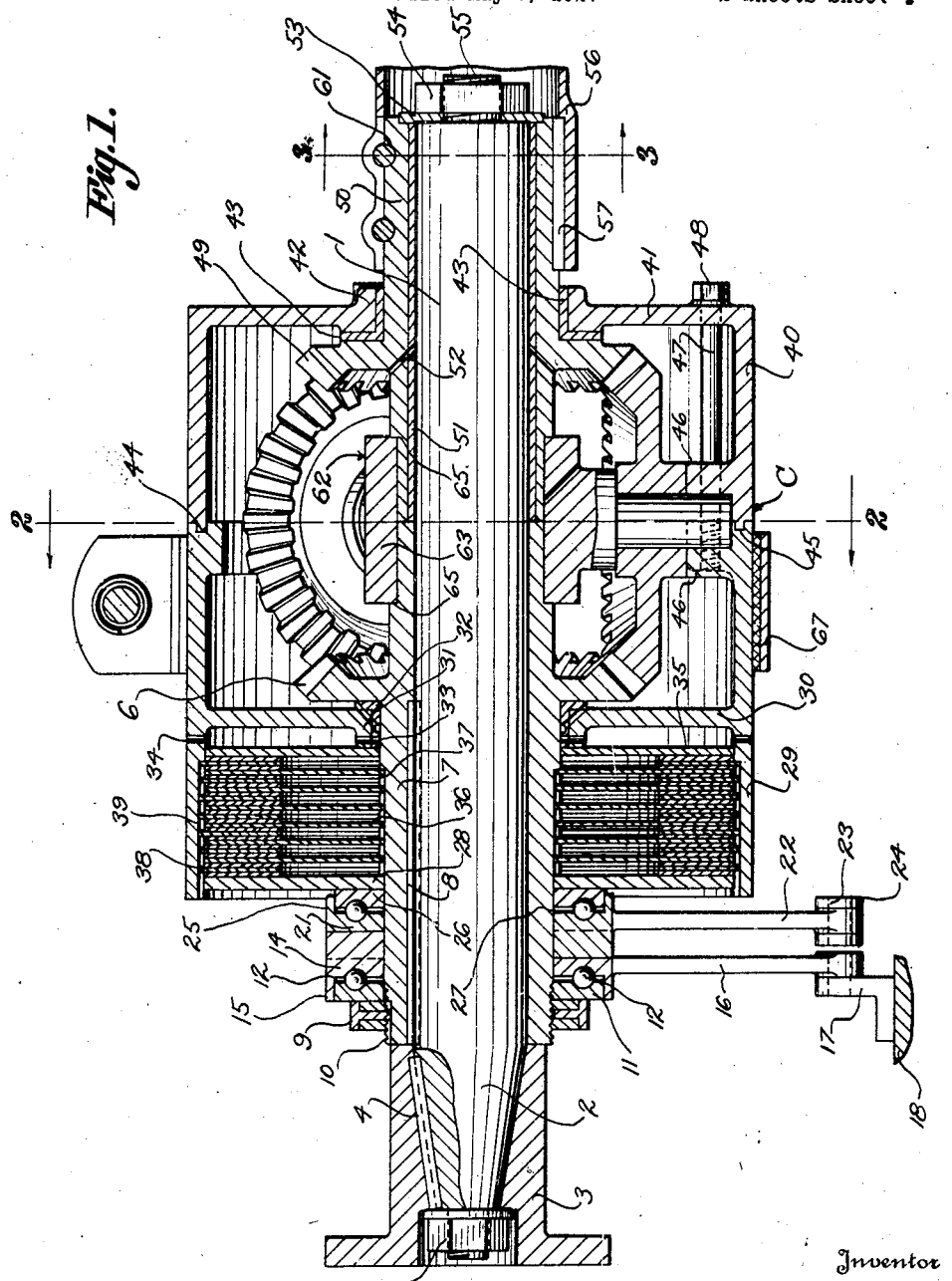
Inventor
Kenneth R. Harmon
By C.A.Snow&Co.
Attorneys

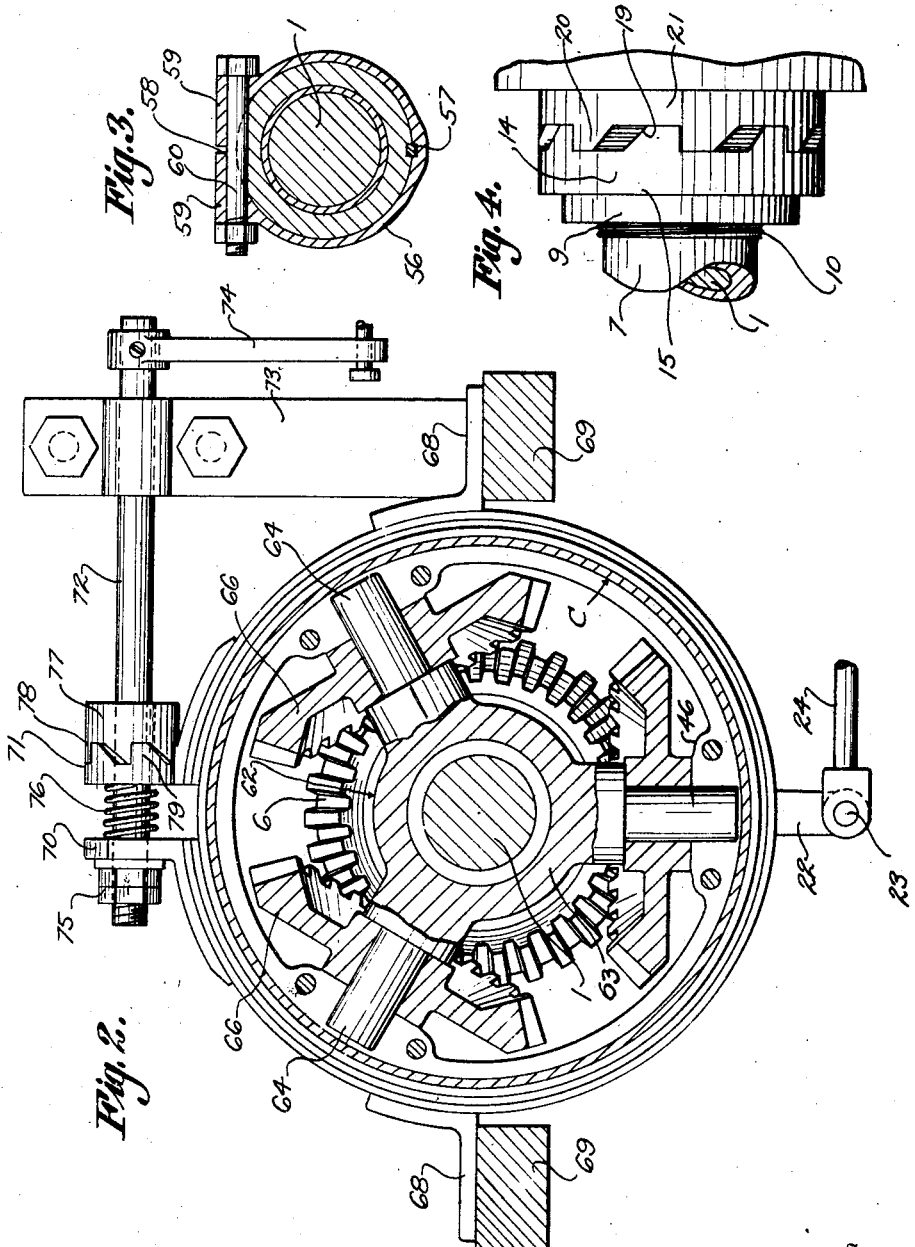

Patented Mar. 27, 1928.

1,663,838

UNITED STATES PATENT OFFICE.

KENNETH R. HARMON, OF NORFOLK, VIRGINIA.

TRANSMISSION MECHANISM.

Application filed May 3, 1927. Serial No. 188,535.

This invention aims to provide a simple and compact transmission mechanism, for use on small power boats, or under any conditions that call for a device of the class described. The invention aims to provide novel means whereby a plate clutch and a differential may be combined and housed, the construction being such that a reversal may be brought about simply and easily. The invention aims, furthermore, to provide a transmission mechanism which, being made of two parts, will stand up under hard use.

It is within the province of the disclosure to improve generally and to enhance the utility of devices of that type of which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in longitudinal section, a device constructed in accordance with the invention, some parts being in elevation;

Figure 2 is a cross section on the line 2—2 of Figure 1, parts being in elevation;

Figure 3 is a section on the line 3—3 of Figure 1;

Figure 4 is a fragmental elevation showing the actuating members for the plate clutch.

The numeral 1 marks a shaft having a tapered end 2 connected to a flanged coupling 3 by a key 4 and a nut 5. The differential mechanism, to be described hereinafter, embodies a beveled pinion 6 having a tubular hub 7 which is keyed at 8 to the shaft 1, the hub 7 abutting against the coupling 3. A thrust member 9 is threaded at 10 on the end of the hub 7 and engages a race 11 through which the hub 7 extends, the race being located within the rim 15 of a fixed actuating member 14, in which the hub 7 can turn, the actuating member 14 being referred to as fixed, because it is connected, through the instrumentality of an arm 16 and a bracket 17, with any accessible part 18 of the frame work of the boat or vehicle wherewith the device claimed is used. Balls 12 are interposed between the race 11 and the actuating member 14. The actuating member 14 has teeth 19 provided with inclined surfaces adapted to cooperate with corresponding surfaces on the teeth 20 of a circumferentially shiftable actuating member 21 through which the hub 7 passes, the actuating member 21 being supplied with a depending arm 22 which is pivoted at 23 to a link 24 or the like. The actuating member 21 has a marginal rim 25 within which is located a race 26 through which the hub 7 passes, balls 27 being interposed between the race 26 and the actuating member 21.

The race 26 engages a pressure plate 28 disposed about the hub 7 and located in one section 29 of a tubular casing C. The section 29 of the casing has a partition 30 provided with a hub 31 within which is located a bushing that extends between the pinion 6 and the partition 30, and also receives the hub 7 for rotation. There is an oil hole 33 in the hub 31 and in the bushing 32, so that oil can find its way to the hub 7, the section 29 of the casing C having an external oil hole 34.

An abutment plate 35 is disposed about the hub 7 of the pinion 6 and engages the hub 31 of the partition 30. Clutch plates 36 are splined at 37 to the hub 7, clutch plates 38 being splined at 39 to the section 29 of the casing C, the clutch plates 36 and 38 being compressible between the pressure plate 28 and the abutment plate 35 to effect a driving connection between the hub 7 and the section 29 of the casing C. At this point it should be noted that the plate clutch 36—38, and the pressure plate 28 are housed within the section 29 of the casing.

The casing C embodies a section 40 provided at one end with a wall 41 having a hub 42 within which is located a bushing 43. At its opposite end, the section 40 of the casing has an annular flange 44 received in an annular groove 45 in the end of the casing section 29. At their inner ends, the casing sections 29 and 40 have cooperating lugs 46, which form bearings, and into these lugs are threaded connecting bolts 47, or other securing elements, the heads 48 of which engage the end wall 41 of the casing section 40, to hold the members 40 and 29 assembled.

The numeral 49 marks a differential pinion, supplemental to the pinion 6, and having an elongated tubular hub 50 that is journaled in the bushing 43, a bushing 51 being located within the hub 50, about the shaft 1, the inner ends of the hub 50 and the bushing 51 being disposed closely adjacent to the inner end of the hub 7 of the pinion 6. For the lubrication of the shaft 1, within the bushing 51, the bushing and the hub 50 are supplied with cooperating oil holes 52. The bushing 51 is held in place by a washer 53 and a nut 54 on the reduced end 55 of the shaft 1. Power is taken off by a coupling 56 which is keyed at 57 to the hub 50, the coupling being split as at 58, and being provided with lugs 59 through which pass draw bolts 60 engaged in transverse seats 61 in the hub 50.

The numeral 62 designates a differential spider, including a collar 63 and radial arms 64, the hubs 50 and 7 being rotatably received within the collar 63, and being provided with shoulder 65, between which the collar is located. The outer ends of the arms 64 are received in the bearings that are formed by the lugs 46. On the arms 64 are journaled gear wheels 66 which mesh with the beveled gears 6 and 49.

A means is provided whereby the casing C can be held against rotation, and with this end in view, the section 29 of the casing is surrounded by a brake strap 67 having feet 68 that rest upon any accessible parts 69 of the frame work of the vessel of the vehicle on which the device is used. The brake strap 67 has brackets 70 and 71 through which passes a shaft 72 journaled in a standard 73 on one of the frame parts 69, any suitable means 74 being supplied for rocking the shaft 72. Superposed nuts 75 on the shaft 72 cooperate with the bracket 70, and a compression spring 76 is mounted on the shaft 72, between the brackets 70 and 71, to slack away the brake strap 67. There is a fixed head 77 on the shaft 72, the head 77 having teeth 78 which cooperate with teeth 79 on the bracket 71, the teeth 78 and 79 having inclined cooperating surfaces.

By means of the link 24 and the arm 22, the shiftable actuating member 21 may be rocked, its inclined teeth 20 cooperating with the teeth 19 of the actuating member 14 to move the member 21 to the right in Figure 1, the clutch plates 36 and 38 being pressed together thereby to couple the casing C to the hub 7. Assuming that the brake strap 67 is loose, there is established a driving train including the coupling 3, the key 4, the shaft 1, the key 8, the clutch 36—38, the casing C, the differential gears 6—66—49, between which there is no relative rotation, the hub 50, and the coupling 56 which is keyed at 57 to the hub 50 of the differential gear 49.

When a reversal is desired, the link 24 is operated to turn the shiftable actuating member 21 and to release the clutch 36—38. The shaft 72 is rotated to set up the brake strap 67 on the casing C and hold it against rotation. Then, when the hub 7 is rotated, the pinion 6 turns the gear wheels 66, and reverse rotation is imparted to the coupling 56 by way of the pinion 49, the hub 50, and the key 57.

What is claimed is:—

In a device of the class described, a tubular casing comprising longitudinally separable sections, one section having an end wall, and the other section being provided intermediate its ends with a partition, reversing mechanism including a beveled pinion having a hub the outer end of which is journaled in the partition, and a beveled pinion having a hub the outer end of which is journaled in the end wall, a beveled gear meshing with the pinions; a spider including an arm whereon the gear is journaled, the arm being carried by a collar receiving the inner ends of the hubs of the pinions rotatably, the outer end of the arm being mounted between the sections of the casing, and means for holding the sections of the casing together releasably on the arm; a shaft in the hubs, the hub of the first-specified pinion being secured to the shaft, and the hub of the second-specified pinion being rotatable with respect to the shaft, a clutch for which the partition forms an abutment, the clutch connecting the casing with the hub of the first-specified pinion, the clutch being housed within the casing on one side of the partition, and the reversing mechanism being housed within the casing on the other side of the partition, means for forcing the clutch into abutting relation to the partition, thereby to operate the clutch, and means under the control of an operator for restraining the rotation of the casing when the clutch is in inoperative position.

In testimony that I claim the foregoing as my own, I have hereto affixed my signature.

KENNETH R. HARMON.